United States Patent Office 3,317,046
Patented May 2, 1967

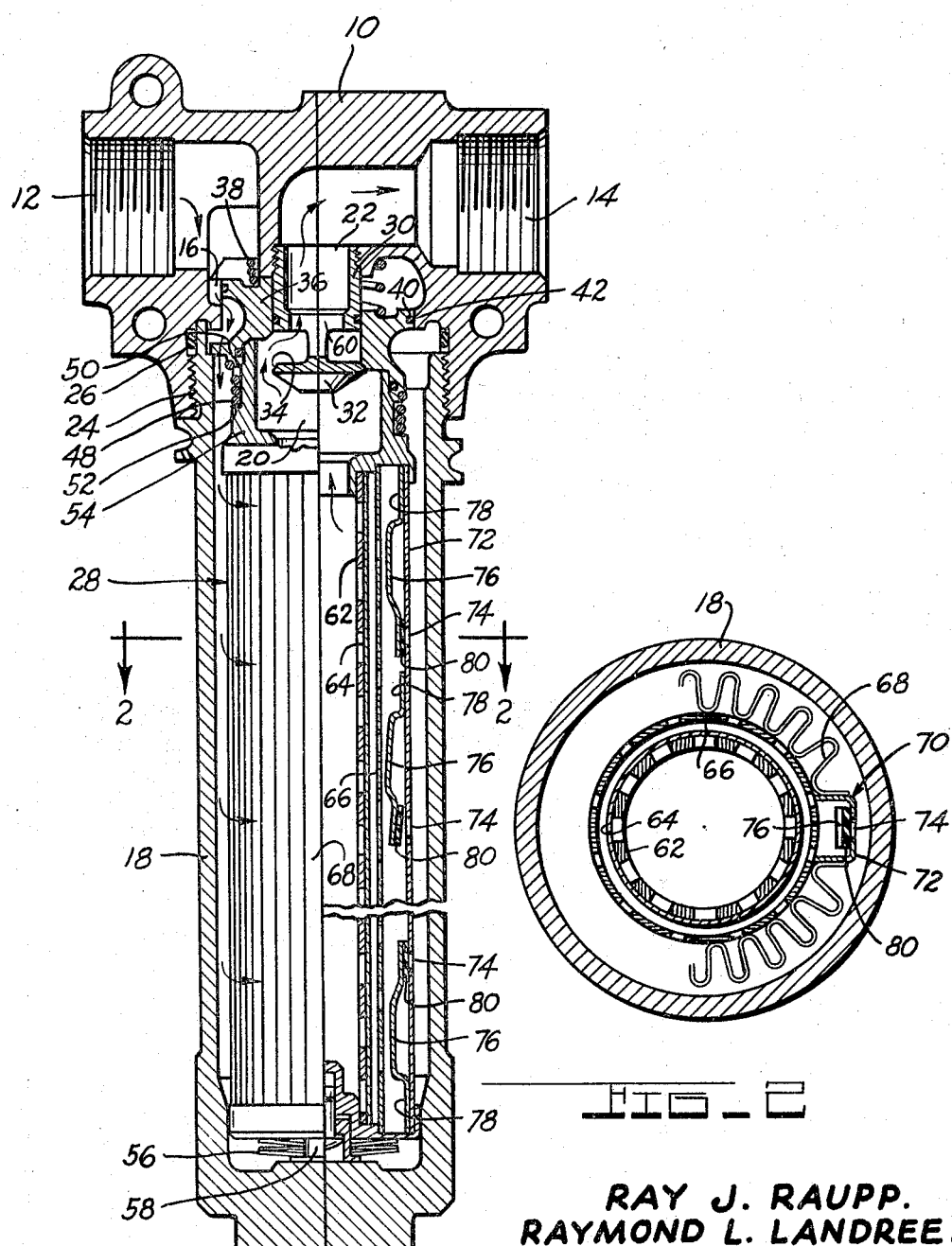

3,317,046
FILTER ELEMENT HAVING PLURAL FLAPPER TYPE BYPASS VALVES THEREON
Ray J. Raupp and Raymond L. Landree, Madison Heights, Mich., assignors to The Bendix Corporation, Madison Heights, Mich., a corporation of Delaware
Filed Jan. 6, 1965, Ser. No. 423,772
1 Claim. (Cl. 210—130)

This invention relates to filtering units and more particularly to a filter element bypass valve therefor.

Since the viscosity of fluids increases greatly at low temperatures and results in abnormally high pressure drops across a filter element at such temperatures, a low collapse filter element will tend to break or channel under such circumstances unless a bypass valve is utilized to limit the differential pressure acting thereacross.

Accordingly, it is an object of this invention to provide a bypass valve for use in connection with a low collapse filter element which will permit satisfactory operation of the element under low temperature conditions.

Another object of this invention is to provide a bypass valve which will prevent the differential pressure acting across a low collapse filter element from exceeding a predetermined value.

A further object of this invention is to provide a filter element and bypass valve for insertion in filter housings which do or do not include permanent integral bypass valves.

More specifically, it is an object of this invention to provide a disposable bypass valve assembly which is an integral part of the filter element.

Other objects and advantages of this invention will become apparent from the following description taken in connection with the accompanying drawing which forms a part of this disclosure and in which:

FIGURE 1 is a view partially in section of a filtering unit which incorporates the invention, and FIGURE 2 is a sectional view taken along the line 2—2 of FIGURE 1.

Referring to FIGURE 1, it will be seen that the numeral 10 indicates a filter head having an inlet port 12 and an outlet port 14 which communicate with each other via passage 16, fluid bowl 18, and passages 20 and 22, respectively. The bowl is secured in place to the lower side of the head 10 by screw threads 24 and is sealed thereto in fluid tight relationship by an O-ring 26. A suitable filter element assembly 28 is disposed in the fluid bowl in such a manner that fluid flowing between the inlet port 12 and outlet port 14 will flow therethrough, as indicated by the arrows.

A guide member 30 having a valve stop member 32 formed on the end thereof is attached to the filter head 10 and extends toward the filter bowl 18. A valve seat 34 is formed on the upper surface of valve stop member 32. A valve spool or sleeve 36 is slidably mounted on guide member 30 and is urged by spring 38 from an open position, as shown on the left-half of FIGURE 1, towards a closed position, namely, to a position wherein valve sleeve 36 is in metal-to-metal contact with valve seat 34 formed on valve stop member 32, as shown on the right-half of FIGURE 1. The valve sleeve 36 carries an O-ring 40 which is arranged to contact the inner edge of the annular projection 42.

The filter assembly 28 is retained within filter bowl 18 through means of spring 48 which abuts a shoulder 50 formed on sleeve 36 and a shoulder 52 formed on a retainer 54, thereby urging the filter element towards the bottom of the bowl. Interposed between the lower end of the filter assembly and the bottom of the bowl is a series of Belleville washers 56 and a screw 58 for adjusting the preload of these spring washers.

Referring to the left-half portion of FIGURE 1, wherein the shut-off valve is in an open position, it will be seen that fluid enters the inlet port 12, passes downwardly through the annular passage 16 formed between valve sleeve 36 and filter head 10, and then enters the filter bowl 18. After passing through the filter element assembly 28 from the outside thereof to the inside thereof, the filter fluid proceeds upward through passage 20, through the radial passage 60 of the guide member 30, through passage 22, and out through outlet port 14.

When the bowl is partially removed, spring 38 causes the valve spool or sleeve 36 to move downward against the valve seat 34 of valve stop member 32, as shown on the right-half portion of FIGURE 1, so that the intimate metal-to-metal contact prevents external leakage from the outlet passage. Simultaneously, the O-ring 40 contacts the inner edge of the annular projection 42 thereby preventing external leakage from the inlet passage.

Filter element assembly 28 comprises an inner core 62 surrounded by a stainless steel mesh 64, an outer low collapse core 66 surrounded by a pleated low collapse filtering medium 68, such as fiberglass or paper, and a bypass valve assembly 70. The bypass valve assembly includes a U-shaped metal strip 72 having a plurality of bypass ports 74 and a plurality of pressure responsive flapper type valve elements 76 on the downstream side for controlling flow through each of the bypass ports. Each flapper type valve in effect is a leaf spring, one end 78 of which is rigidly attached to the metal strip and the other end of which is freely movable and has a resilient valve pad 80 bonded thereto for sealing engagement with its associated bypass port. The U-shaped strip 72 extends the length of the pleated element 68 and is attached to the pleats through a suitable adhesive. Each of the pad ends of the flapper valves have one side thereof exposed to the pressure upstream of the pleated element and the other side exposed to the pressure downstream of said pleated element. At a predetermined differential pressure acting across said flapper valves, the valves will move from a closed position to an open position. In FIGURE 1, the upper and lower valves are shown in a closed position, whereas the middle valve is shown in an open position. In this manner the bypass valve assembly 70, which is an integral part of the filter assembly 28, prevents the differential pressure from exceeding a predetermined pressure and causing the low collapse element from breaking or channeling.

Although this invention has been described in connection with a specific embodiment, it will be obvious to those skilled in the art that various changes may be made in the form, structure and arrangement of parts without departing from the spirit of the invention. Accordingly, applicants do not desire to be limited to the specific embodiment disclosed herein primarily for purposes of illustration, but instead desire protection falling within the scope of the appended claim.

Having thus described the various features of the invention, what we claim as new and desire to secure by Letters Patent is:

A device for filtering fluids comprising a head having an inlet passage and an outlet passage, a bowl removably attached to the head for communicating said inlet passage with said outlet passage, a removable substantially cylindrical low collapse pleated filter element of the outside-in flow type located in said bowl and interposed between said inlet and outlet passages, a U-shaped strip fixedly attached to and extending the full length of said pleated element, said strip having a plurality of bypass ports therein and a plurality of pressure responsive flapper type valves located on the down-stream side of said filter element and within said U-shaped strip for completely bypassing the entire filter element by permitting flow through said bypass ports when the pressure differential across said filter element increases above a predetermined value, said flapper type valves each including a leaf spring, one end of which is rigidly attached to said strip and the other end of which has a valve pad affixed thereto and in sealing engagement with an associated bypass port for controlling flow therethrough, said pad end of said flapper type valves having one side thereof exposed to the pressure upstream of said filter element and the other side thereof exposed to the pressure downstream of said filter element.

References Cited by the Examiner

UNITED STATES PATENTS

| | | | |
|---|---|---|---|
| 1,768,350 | 6/1930 | Chase | 210—130 |
| 2,692,027 | 10/1954 | Ammons | 55—313 X |
| 3,040,894 | 6/1962 | Pall | 210—235 X |
| 3,077,715 | 2/1963 | Carroll | 55—313 X |

FOREIGN PATENTS 1,368,602　6/1964　France.

REUBEN FRIEDMAN, *Primary Examiner.*

F. SPEAR, *Assistant Examiner.*